Jan. 30, 1940.                G. D. PAPPAJION                2,188,843
                  NUMBERING DEVICE FOR PHOTOGRAPHIC FILMS
                      Filed Sept. 20, 1938      3 Sheets-Sheet 1
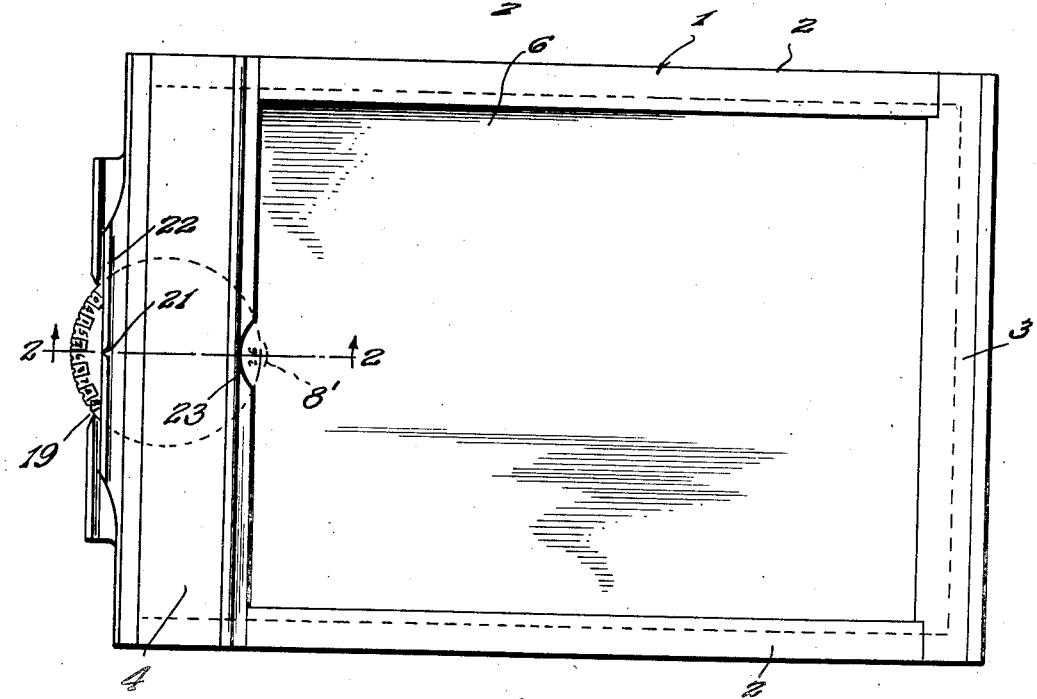
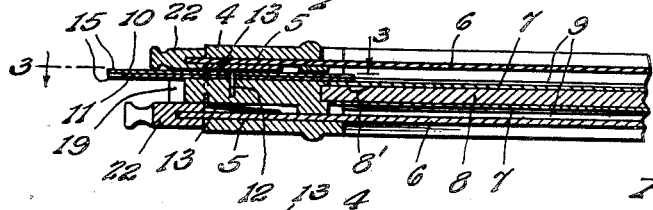
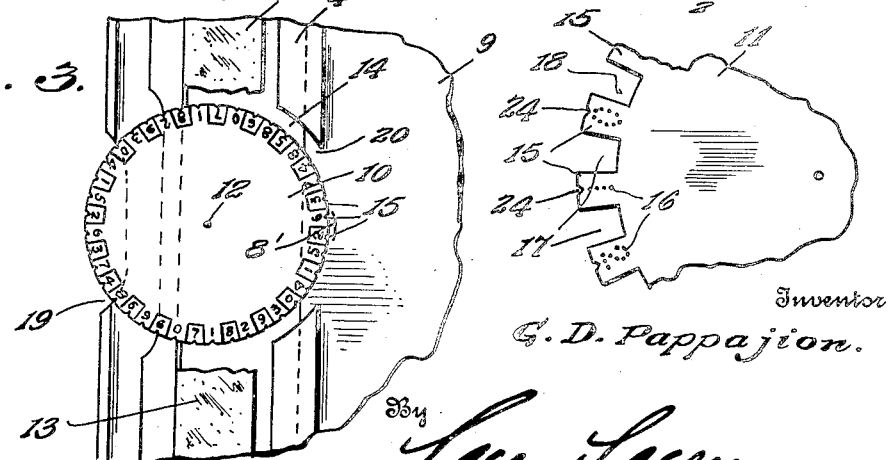
Inventor
G. D. Pappajion.
By Lacey & Lacey
Attorneys Jan. 30, 1940. G. D. PAPPAJION 2,188,843
NUMBERING DEVICE FOR PHOTOGRAPHIC FILMS
Filed Sept. 20, 1938 3 Sheets-Sheet 2
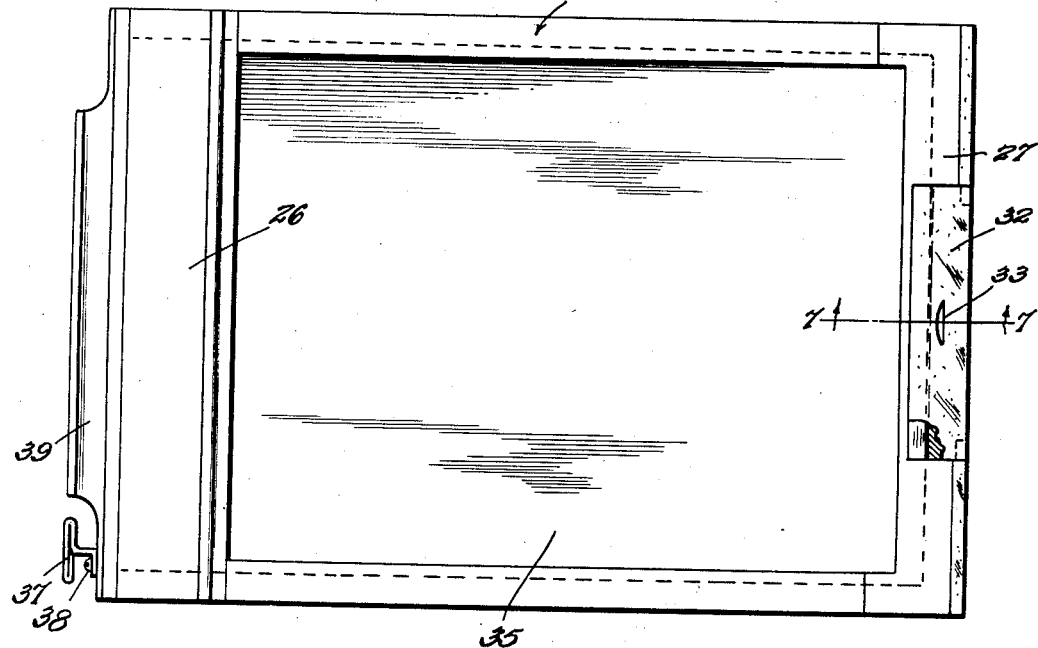
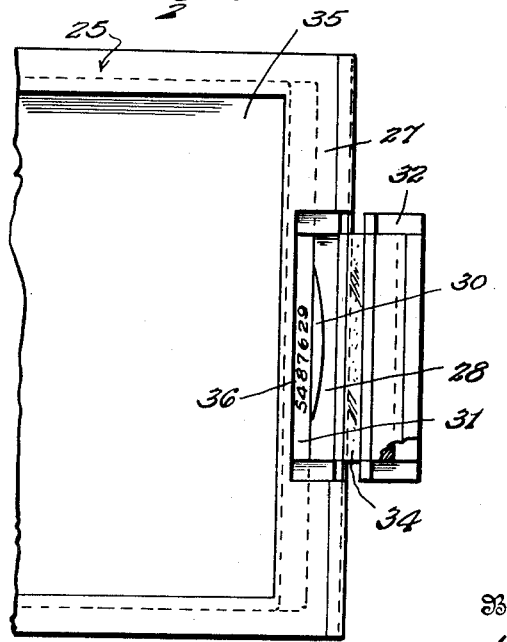
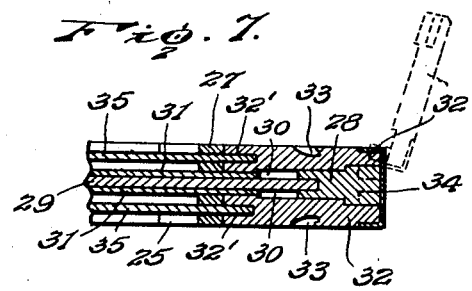
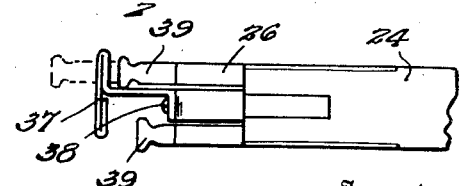
Inventor
G. D. Pappajion.
By Lacey & Lacey,
Attorneys Jan. 30, 1940. G. D. PAPPAJION 2,188,843
NUMBERING DEVICE FOR PHOTOGRAPHIC FILMS
Filed Sept. 20, 1938 3 Sheets-Sheet 3
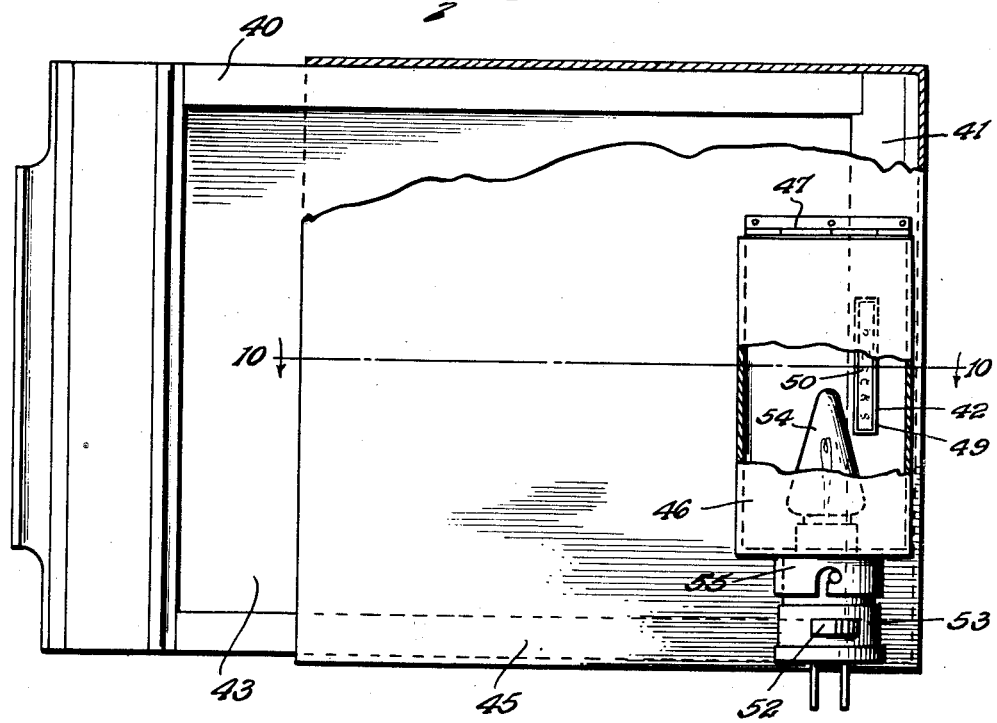
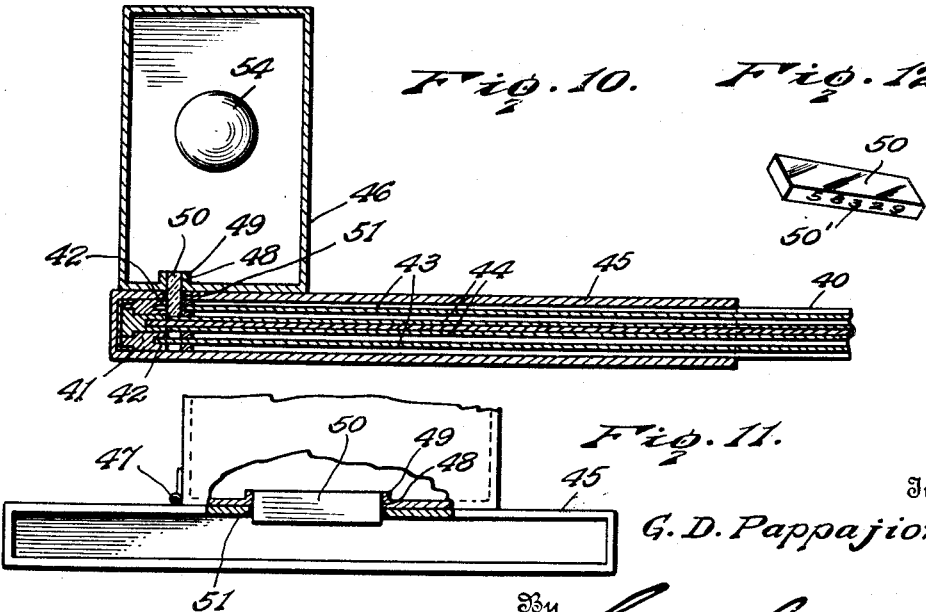
Inventor
G. D. Pappajion.
By Lacey & Lacey
Attorneys Patented Jan. 30, 1940

2,188,843

UNITED STATES PATENT OFFICE 2,188,843

NUMBERING DEVICE FOR PHOTOGRAPHIC FILMS

George D. Pappajion, Danielson, Conn.

Application September 20, 1938, Serial No. 230,892

7 Claims. (Cl. 95—1.1)

This invention relates to a numbering device by means of which photographic films may have identifying numbers applied thereto, and it is one object of the invention to provide a device of this character of such construction that, when a picture is taken by exposing a film in a camera, the film may be marked with an identifying number applied either before, during or after exposure of the film. The film will thus be permanently marked and may be very easily located when wanted by merely looking up the number in a record book or card file.

Another object of the invention is to provide a simplified means for numbering the exposed films for identification purposes, it being very difficult under present methods to number them in the dark room, as it is hard to separate them after development. This is especially true when several sittings are made in a day and many negatives have been damaged and mixed up while being numbered in the dark room, whereas this invention eliminates all guess work and saves valuable time and makes it easier for an operator to mark all his exposed negatives with the name, serial or day number of the sitter.

Another object of the invention is to provide a device of this character including a film-holding frame having means associated therewith whereby the film may be provided adjacent a marginal edge with the identifying number or name while still in the frame.

Another object of the invention is to provide the film-holding frame with numbering means of such construction that it will not increase the dimensions of the frame and thus permit the frame to be used in a camera of a conventional construction.

It is another object of the invention to provide a device of this character constituting an accessory and into which a film-holding frame is thrust during application of the identifying number to the film.

It is another object of the invention to provide a numbering device consisting of a casing to receive the film-holding frame and having associated with it means for projecting light through a plate formed of glass, celluloid or similar material and having the identifying numbers marked thereon.

The invention is illustrated in the accompanying drawings, wherein:

Figure 1 is a view looking down upon a film-holding frame having one embodiment of the film-marking means associated therewith, Figure 2 is a sectional view taken along the line 2—2 of Figure 1, Figure 3 is a fragmentary view taken along the line 3—3 of Figure 2, Figure 4 is a view of a portion of one of the disks by means of which identifying numbers are applied to a film in the frame, Figure 5 is a view similar to Figure 1 showing a film-holding frame provided with a modified form of film-marking means, Figure 6 is a view of one end portion of Figure 5 showing the hinged portion of the frame swung to an open position and the exposed marginal portion of the film marked with an identifying number or name, Figure 7 is a sectional view taken along the line 7—7 of Figure 5, Figure 8 is a view in side elevation of the end portion of the frame through which the films are inserted and removed, Figure 9 is a top plan view of another modified embodiment of the invention with portions shown in section, Figure 10 is a sectional view taken along the line 10—10 of Figure 9, Figure 11 is a view looking at the open end of the casing into which the film-carrying frame is inserted during a marking operation, and Figure 12 is a perspective view of a transparent plate or die through which light passes in order to mark a film with an identifying number carried by the plate.

The film-carrying frame 1 may be formed from wood or any other desired material and has side bars 2, a rear end bar 3 and a front end bar 4 formed with slots or passages 5 through which the plates or shields 6 are passed for covering the films 7 disposed against opposite side faces of the partition plate 8. This is the usual manner in which film-holding frames are formed, and the usual guides 9 for engaging side edge portions of the films are provided to hold the films flat against the partition 8 when the shields 6 are withdrawn during exposure of the films in a camera.

Referring to Figures 2 and 3, it will be seen that under one of the shields 6 there have been rotatably mounted disks 10 and 11 formed of material through which light will not penetrate. These disks are rotatably mounted by a pin 12 so that they may be turned about the pin, and since the adjacent packing strip 13 bears against the outer face of the disk 10, undesired passage of light through the space 14 in which the disks are rotatably mounted will be prevented. About their peripheries the disks 10 and 11 are cut to form tongues 15 which are perforated or otherwise provided with numerals 16, and since the tongues 15 are separated from each other by spaces 17 corresponding in width to the width of the tongues, the tongues of the outer disk 10 may be disposed between the tongues of the inner disk 11. It will thus be seen that the two disks may cooperate with each other to form numbers having more than one numeral. The numerals are arranged around the disks in inner and outer series, as shown in Figure 3, and each numeral of the outer series is a duplicate of a diametrically opposed numeral of the inner series. By providing the inner disk 11 with a large space 18 of extra width, the tongues of the outer disk may be individually moved into position over this wide space and numbers consisting of a single numeral formed. The disks are of such diameter that their outer peripheral portions will project through the recess 19 formed in the outer side edge of the intermediate portion of the end bar 4, while the inner peripheral portions of the two disks will be exposed through the recess 20 of the end bar when the shield is withdrawn. The disks 10 and 11 have only been shown between the end bar and one of the shields in Figure 2, but it is to be understood that a duplicate set of disks will preferably be provided for the other side of the film-holding frame instead of only one side, as shown.

When this film-holding frame is in use, the films are applied in the usual manner through the open sides of the frame after the shields have been removed and side edge of the film engaged under the guides 9 while ends of the films are disposed under the disks, as shown in Figures 2 and 3, so that these disks will overlap and rest tightly against the film. The partition plate 8 is notched, as shown at 8', in order that the disks may be flexed upwardly by a finger nail and the film easily slid under the disks. The shields are then replaced and the film-holding frame may be thrust into a camera in the usual manner for use. Before the film-holding frame is thrust into the camera, the disks will be turned about the pivot pin 12, and since each disk has its tongues formed with two sets or series of opposed numerals from 1 to 9 and then a zero, the portions of the disks exposed beyond the end bar will have numerals upon its tongues which are duplicates of the numerals upon diametrically opposed inner tongues. Therefore, the operator may turn the disks to move the desired outer numerals of the two disks into place opposite the pointer 21 formed midway the length of the binding strip 22 of a shield, and the corresponding numeral or set of numerals of the inner series will be exposed through the recess 23 at the inner side of the cross bar 4. Notches 24 are formed at outer ends of the tongues of the two disks in order that the disks may be easily turned about the pivot pin 12. When the film-holding frame is in place within a camera and the shield is withdrawn and the shutter operated to make the exposure, then the number is registered simultaneously on the film. As the light strikes the film, a portion of the light will pass through the exposed numerals of the disks and, when the film is developed, the number formed by the exposed numerals will appear upon the film and serve as means for identifying the film. A record of the number will be kept in a record book or card file, and the film may be very easily located and removed from a file when needed at a later date. A series of negatives made at one sitting may all be given the same identifying number or they may have individual numbers if so desired.

In Figures 5 through 8, there has been illustrated a modified embodiment of the invention. The film-holding frame 25 shown in these figures does not have its end bar 26 formed with a recess, corresponding to the recess 20, and the disks shown in Figures 1 through 4 are not employed. The end bar 27 at the opposite end of the frame from the end bar 26 has its bib section or strip 28, which is engaged by the partition 29, formed with recesses 30 in order that a finger nail or the like may be easily engaged under the edge of a film 31 during insertion or removal of a film from the film-holding frame. A portion of each outer strip of the end bar 27 is cut to provide a door or closure 32 having its outer face notched, as shown at 33, in order that the door may be swung from the closed position shown in Figure 5 to the opened position shown in Figure 6 and indicated by dotted line in Figure 7. These two doors or closures are hinged for swinging movement from a closed position to an opened position by means of a strip of leather 34, but it is to be understood that the closures may be hinged by other means instead of using a strip of leather or the closures may be mounted for movement into and out of a closed position in any other desired manner. Along its inner side edge each door is formed with a longitudinally extending groove 32' to receive a portion of the shield 35, and upon referring to Figure 7, it will be seen that, when the doors are closed and the two shields thrust inwardly their full extent with their end portions engaged in the groove 32', the doors will be held in a closed position. Either before or after exposing a film, the shields may be slid outwardly a short distance until the door is freed and the door then swung open, as shown in Figure 6, so that an identifying number or name may be marked upon an exposed portion of the film, as shown at 36. The remainder of the film will still be covered by the shield and no damage will be done if the film is marked outside a dark room. It is desired to prevent the shields from being accidentally slid outwardly too far, and in order to do so, there has been provided a stop 37 which is substantially T-shaped and has its shank secured by a screw 38 to the outer side edge of the end bar 27 between the end strip 39 of the shield. When the stop is in the position shown in Figure 8 with its cross head extending transversely of the strip 39, outward movement of the shield will be limited and danger of unintended exposure of the entire film or a large portion thereof will be avoided. By turning the stop about the screw 38 to the position shown in Figure 5, both of the shields may be entirely withdrawn for removal of an exposed film in a dark room or insertion of a new film. It will thus be seen that a picture may be taken in a camera in the usual manner and the shield over the exposed film or negative then drawn outwardly a short distance to release the closure 32 and permit the closure to be swung to an open position and an identifying number or name marked upon the film near one end thereof. The film will thus be permanently marked with an identifying number and, when this number is recorded in a book or file card, the film may be put away and easily located if wanted at a later date.

In Figures 9 through 12, another modified embodiment of the invention has been illustrated which may be used in daylight outside a dark room. In this embodiment of the invention, the film-holding frame 40 is of a conventional construction, except that the end bar 41 is formed midway its ends with opposed slots 42. After a picture has been taken and the shield 43 replaced to cover the films 44, the film-holding frame is removed from the camera and thrust into a casing 45 which is open at one end and formed of material through which light may not pass. A housing 46 formed of material through which light may not pass is disposed over the casing 45 and hinged at one end, as shown at 47, in order that it may be swung from the lowered position for use shown in Figures 10 and 11 to a raised position. A slot 48 bordered by an inwardly extending wall 49 is formed through the bottom of the housing, and into this slot is removably fitted a glass plate 50 having its upper and lower edges ground and its lower edge face marked with a number, as shown at 50'. The plate 50 projects downwardly below the bottom of the housing and, when the housing is in the lowered position for use, this plate extends through a slot 51 formed in the upper wall of the casing 45. Therefore, when the film-holding frame is thrust into the casing, as shown in Figure 10, and the upper shield slid outwardly a short distance to expose an end portion of the uppermost film 44, the lower edge face of the plate having the number marked thereon may be disposed in engagement with the film, and when the switch 52 of the terminal plug 53 is closed to cause illumination of the bulb 54 carried by the socket 55, light will pass through the glass plate 50 and cause the identifying number to be transferred to the end portion of the film. The housing 46 may then be swung upwardly a short distance so that the shield may be thrust inwardly its full extent, and upon movement of the housing to a raised position the film-holding frame may be withdrawn from the casing 45. The film-holding frame may then be reversed and the operation repeated so that the second film will be marked with an identifying number. The same number may be used in all films of the same sitting, and for each succeeding sitting another plate 50 bearing an identifying number set in place within the slot 48 before the housing is swung downwardly into position for use. By having the upper and lower edge faces of the glass plate ground, the light passing through the plate will be diffused and the numerals of a number transferred to a film with equal clearness. When the films are removed from the film-carrying frame and developed, the developed films or negatives will bear identifying numbers, and after these numbers are recorded in a record book or upon cards of a card index, the films may be put away and very easily located at a later date if needed.

Having thus described the invention, what is claimed as new is:

1. A film-holding frame having side and end bars, one end bar being formed with a pocket open at its inner and outer ends and the inner edge portion of the side bar being formed with a recess communicating with the pocket, and a pair of disks in said pocket rotatably carried by the end bar with their corresponding outer peripheral portions projecting from the outer edge of the end bar and their other peripheral portions exposed through the recess, said disks having their peripheral portions provided with characters adapted to be transferred to a film in the frame and overlapped at one end by the inner peripheral portions of the disk.

2. A film-holding frame having side and end bars, one end bar having a pocket therein open through inner and outer side edges of the end bar, and disks rotatably mounted in said pocket one above another with their inner peripheral portions exposed at the inner edge of the said end bar and their outer peripheral portions projecting from the outer side edge of the said end bar, said disks having their peripheral portions formed with radially extending tongues spaced from each other circumferentially of the disks whereby the tongues of the upper disk may be disposed between the tongues of the lower disk, said tongues being provided with characters adapted to be selectively transferred to an end portion of a film disposed in the frame and overlapped by the inner peripheral portion of the disks when the disks are turned to bring selected tongues into overlapping relation to the film.

3. A film-holding frame having side and end bars, a shield slidable into and out of said frame through one end bar, the other end bar having a portion cut out to provide a closure mounted for movement into and out of a closed position, the closure and the last-mentioned end bar being grooved to receive an end portion of said shield whereby the shield when thrust into the frame may engage in the groove of the closure and hold the closure in a closed position, said closure when released and moved to an open position exposing an end portion of a film under the shield whereby identifying marks may be provided upon the film, and an abutment carried by the first-mentioned end bar and movable into and out of position to limit outward movement of the shield.

4. A film-holding frame having side and end bars, a shield thrust into said frame through one end bar, the second end bar having a portion cut out to provide a closure movable into and out of a closed position whereby the closure may be moved to an opened position when the shield is partially withdrawn to expose an end portion of a film under the shield and permit marking of the exposed portion of the film with identifying mark.

5. A film-holding frame having side and end bars, a shield slid into said frame through one end bar, the other end bar having a sight opening for exposing a portion of the film carried by the frame whereby the exposed portion of the film may be marked with identifying characters, a closure for said sight opening movable into and out of closing relation thereto, and an abutment member pivoted to the first-mentioned end bar for turning adjustment and having a cross-head moved into and out of position to limit outward movement of said shield by turning the abutment.

6. A film-holding frame having side and end bars, one end bar being formed with an opening, a shield slidable into said frame through the other end bar and being of a length adapting it to cover the inner end of said opening, a casing open at one end and of dimensions to snugly receive said frame whereby the frame may be thrust into the casing through the open end thereof and fit snugly therein with a portion of the frame projecting outwardly from the casing, said casing having an opening adjacent its closed end to register with the opening in the end bar of said frame when the same is thrust into the casing, a housing over said casing hingedly mounted for tilting movement and having its bottom formed with an opening for registering with the opening in the casing when the housing is moved to a lowered position and rest upon the casing, a member of light penetrable material removably secured in the opening of said housing and projecting downwardly therefrom to pass through the registering openings of the casing and frame, said member having its upper and lower edge faces ground and being provided upon its lower edge face with identifying characters to be transferred onto an exposed portion of a film in the frame when the shield is slid outwardly a short distance, and a bulb in said housing for projecting light through the light penetrable member when energized.

7. A film-holding frame having an opening adjacent one end, a shield for a film carried by said frame and movable into and out of blocking relation to the inner end of the opening, a casing to snugly receive said frame drawn with an opening to register with the opening in the frame, a housing over said casing formed with an opening in its bottom and being movable into and out of position to dispose its opening in registration with the opening in the casing, a block of light penetrable material mounted in the opening of said housing and having identifying characters upon its lower face to be transferred to an exposed portion of a film under the registering openings when the shield is moved out of blocking relation to the opening in the frame and light passes through the block, a socket carried by said housing, and a bulb in said housing carried by said socket.

GEORGE D. PAPPAJION.